E. S. STACK.
AUTOMATIC INSTANTANEOUS WATER HEATING AND STORAGE SYSTEM.
APPLICATION FILED JAN. 20, 1914.
1,237,403.
Patented Aug. 21, 1917.
2 SHEETS—SHEET 1.
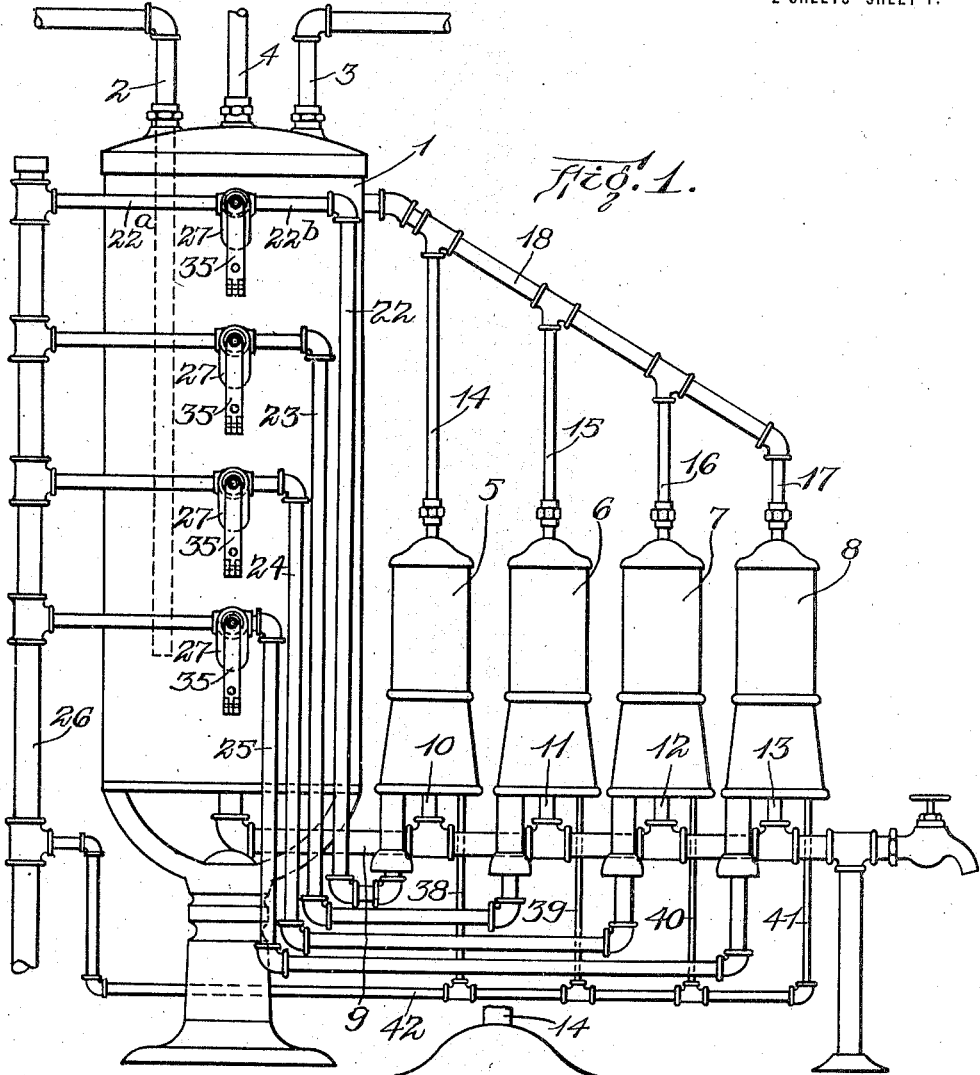
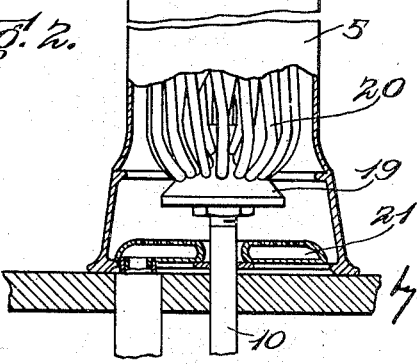

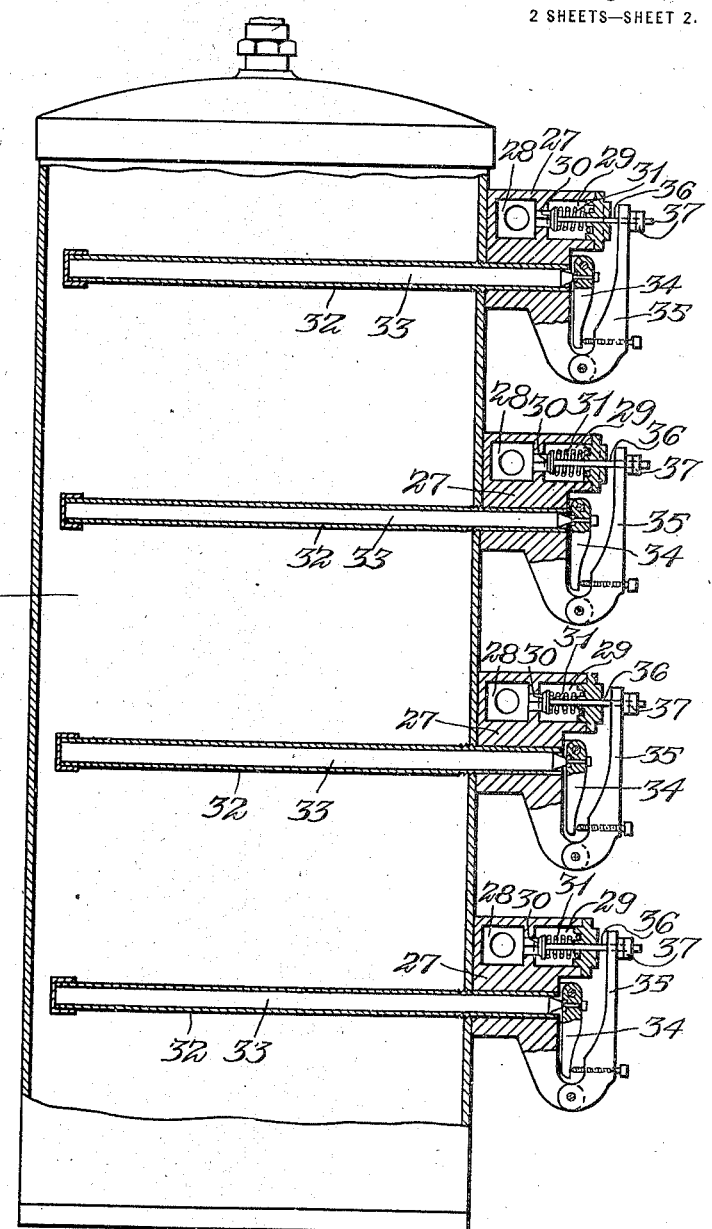

UNITED STATES PATENT OFFICE.

ELMER S. STACK, OF SOMERVILLE, MASSACHUSETTS.

AUTOMATIC INSTANTANEOUS WATER HEATING AND STORAGE SYSTEM.

1,237,403.  Specification of Letters Patent.  Patented Aug. 21, 1917.

Application filed January 20, 1914. Serial No. 813,185.

*To all whom it may concern:*

Be it known that I, ELMER S. STACK, a citizen of the United States, and a resident of Somerville, in the county of Middlesex and State of Mascsachusetts, have invented certain new and useful Improvements in Automatic Instantaneous Water Heating and Storage Systems, of which the following is a specification.

The object of the present application is to provide a water heating apparatus which is capable of supplying heated water in either large or small quantities according to the demands made upon the apparatus. As illustrating the purposes and uses of this invention I may state that it is particularly designed for such institutions as gymnasiums, hotels, clubs and the like where the demands for hot water for bathing and other purposes vary between exceedingly wide limits, and where it is essential that hot water in sufficient quantities to meet all demands should be available upon the instant of the demand. From this statement of one of the purposes of my invention, it will be understood that my general object is to provide an apparatus from which water sufficiently hot to meet the requirements of the service can be obtained at any instant and in any quantities required, under circumstances where the demands as to quantity vary within exceedingly wide limits. It is also a part of my object to provide such a heating apparatus for a circulating hot water system, by which the water in the whole system may be kept hot, and one by which the fuel or other agent used for heating the water is not wasted when the demand is light, or by which the temperature of the water will not be raised to so high a degree as to endanger the integrity of the apparatus by generation of steam nor to a higher degree than that required for the purposes for which the hot water is intended.

The invention briefly stated consists in the combination of a hot water container, with a plurality of water heaters, and automatic means for putting one or more of such heaters into or out of operation according to the demands made upon the apparatus. In the accompanying drawings I have shown the preferred embodiment of my invention without thereby intending to limit the working out of the invention to that particular embodiment.

Figure 1 is an elevation showing in a somewhat diagrammatic manner the entire apparatus.

Fig. 2 is an elevation partly in section showing in detail a form of water heater which I propose to use in connection with and as one of the elements of my apparatus.

Fig. 3 is a vertical sectional view of the water container illustrating a form of automatic means for putting the several heaters successively into and out of operation.

The same reference characters indicate the same parts in all the drawings.

In the drawings,—1 represents a container adapted to contain a body of water, such container being of the general character commonly employed for domestic use. It is equipped with an inlet pipe 2 for supplying water to be heated, which pipe extends into the container well toward the bottom thereof, and with hot water circulating pipes 3 and 4, one of which is the outlet pipe for conducting the heated water to the places where such water is to be used, and the other of which is the return pipe.

5, 6, 7 and 8 represent water heaters which for convenience of illustration are shown in Fig. 1 as being located all in the same plane, but which in practice may be located in that arrangement or in any other manner permitted or required by the restrictions of the space in which the apparatus is installed. Such heaters are fed with the colder water from the bottom of the tank, supplied by a pipe 9 from which branches 10, 11, 12 and 13 lead to the several heaters. The hot water delivered from the heaters flows from outlet pipes 14, 15, 16 and 17 respectively, all of which pipes are shown as joined with a single connecting pipe or conduit leading back to the tank at or near the upper end thereof where the hot water collects. My present invention is not limited to the means by which the hot water is delivered from the heaters to the tank or to the hot water supply pipes. The water from the heaters may be delivered in other ways than that herein illustrated, such as by separate connections from each heater leading independently to the tank, or to the hot water delivering pipes outside of the tank, or the conduit 18 or its equivalent may be connected to one or more of the pipes which conduct the heated water from the tank. If the hot water delivery conduits from the heaters are connected to the outlet pipes from the tank outside of the tank, I would prefer to use for the purpose of so connecting them a connection having the characteristics of the connection shown and described in my United States patent for water connections, No. 1,109,946, granted September 8, 1914.

Any satisfactory water heater may be used for the purposes of this invention, and I do not therefore restrict this invention to a combination of any particular heater with the other elements of the combination. I may say, however, that the type of heater which I prefer to use is that of which the principles are set forth in my patent of the United States No. 1,125,758, granted January 19, 1915, for water heater. Such heater, which is shown somewhat in detail in Fig. 2, includes a bottom header 19, a top header, not shown but similar and oppositely arranged to the bottom header, and a cluster of tubes 20 extending from one header to the other in nearly direct lines so as to permit a free and rapid flow of water, but somewhat inclined so as to cross and intercept the currents of heated gases rising from a gas burner 21 suitably arranged in the base of the heater.

Assuming for convenience that the heater illustrated in Fig. 2 is the heater 5, it will be seen that the supply pipe 10 through which cool water from the bottom of the tank 1 is conducted, leads to the lower header 19, and that the hot water outlet pipe 14 leads from the upper header. All the other heaters shown may be and preferably are duplicates of the heater 5 here particularly described.

Each heater has its own independent gas burner 21, and these burners of the several heaters are fed respectively by supply pipes 22, 23, 24 and 25 which lead or may lead from a common gas main 26 and are so placed as to coöperate with thermostatic valve controlling means governed by the heat of the water in the tank and located at respectively different levels in the tank.

I do not limit my invention to the use in the combination hereinafter claimed of any particular or specific thermostatic valve controlling means, but for the purpose of illustrating an operative means of this character, I have shown a particular thermostatic mechanism which I will now describe, choosing for this detailed description the particular thermostatic device which controls the flow of gas through the pipe 22 to the heater 5. This controlling device includes a valve casing or housing 27 which is mounted externally upon or near the tank 1 and is provided with two internal chambers, 28 and 29, respectively. To one of these chambers is connected that portion of the pipe or conduit 22 which leads from the main and is here particularly designated as 22$^a$, and from the other of these chambers leads the part 22$^b$ of the conduit which runs to the heater. Between the chambers is a partition having an aperture surrounded by a valve seat with which coöperates a valve 30. A spring 31 acts on this valve and tends normally to close it. The thermostatic element consists of a tube 32 extending through the wall of the tank into the interior thereof, and containing a rod 33 fastened to the inner end of the tube. Such rod acts through multiplying levers 34 and 35 pivoted upon brackets which form part of the valve casing structure, the former lever being directly acted upon by the rod and in turn acting on the second lever, and the latter lever being engaged with the stem 36 of the gas valve and arranged to bear against an adjustable abutment 37 thereon. When the thermostatic tube contracts upon cooling, it exerts a thrust on the rod 33 which bears on the short arm of the lever 34. The long arm of the lever acts on the short arm of the lever 35, and the long arm of the latter moves the valve 30 against the pressure of the spring 31 in the direction which causes the valve to be opened. Thereupon gas is admitted to the burner of the heater which is controlled thereby. Expansion of the tube 32 due to heating relieves the rod 38 and allows the spring 31 to close the valve. The thermostatic controlling means for the burners of the other heaters are shown here as being the same as the controlling means above described, and their several parts are designated by the same reference characters as the corresponding parts of the device above described.

In order that the gas may be ignited at the burners upon being admitted thereto after having been shut off, I provide a pilot burner in each heater near the main burner therein, such pilot burner being suppl ed by pipes 38, 39, 40 and 41, which branch from a supply pipe 42 leading from the gas main 26 at a point where the flow is not affected by the operation of the thermostati controlling means.

It will be observed from the drawings that the thermostat controlling the gas supply for the heater 5 is at a high level in the tank 1, that the thermostat for the heater 6 is at a lower level, that for the heater 7 at a still lower level, that for the heater 8 at the lowest level of all. This illustrates a condition which is a fundamental one in this invention, that several heaters are provided for heating the water in the tank, and that these heaters are severally controlled by the temperature of the water in different parts of the tank. It is not an essential feature of my invention that the heaters, the gas supply pipes and the thermostatic valves should be arranged precisely as shown in these drawings, as any other arrangement of valves and piping is permissible provided the condition above described is maintained.

The operation of the apparatus may now be understood. When the entire body of water in the tank is cold, all of the fuel controlling valves are opened by the contraction of their several controlling thermostatic elements and all of the heaters are thereby put into operation, all acting simultaneously to take cold water from the bottom of the tank and return the water heated to the top of the tank. When the water at the level of the uppermost thermostat becomes sufficiently heated, the valve controlled by that thermostat is shut off and the heater 5 is put out of operation. Then if the hot water is not drawn off from the tank as fast as it is heated by the remaining heaters, the hot water occupies more and more of the volume of the tank extending from the top downward until one after another of the thermostats are caused in succession first to reduce and then to shut off the supply of fuel to the heaters which they control, until finally only sufficient of the heaters are left in operation to supply hot water in sufficient quantities to meet the demand. When there is no demand, all of the heaters are shut off when the entire volume of water in the tank has become heated to the desired point. When the hot water is drawn off from the top of the tank, cold water to supply the drain is admitted to the lower part of the heater, causing contraction of the lowermost thermostatic element and putting the heater 8 into operation. If the capacity of this heater is not sufficient to supply the demand for hot water, the next thermostat is actuated and the next heater in the series is made operative, and so on until all the heaters are put into operation if the demand is great enough to require the coöperation of so many heaters. Similarly, if the body of water in the tank becomes cool by radiation, the cooler water settles in the bottom of the tank and when its temperature is sufficiently low the heater 8 is put in operation for a period long enough to raise the tank temperature to the desired point, when it is again automatically discontinued.

It will thus be seen that I have provided means by which a large body of water may be quickly heated to the required temperature automatically and with a relatively small expenditure of fuel. It will also be appreciated that my heating system provides a means by which enough heat may be automatically provided to raise the temperature of as great a volume of water as can pass through the tank to the desired degree, as rapidly as it can be drawn from the tank, while at the same time enabling the amount of fuel consumed to be reduced when the demand is light to heat only the quantity of water required. In this way the greatest possible fuel economy is secured and danger of overheating the water and of generating steam which might burst the tank or loosen the joints of the piping is avoided. It is my intention to provide in each system or apparatus consisting of the combination of elements above described, a number of heaters so great that their combined capacity is as great as the total discharge capacity of the tank. The system or apparatus may be made as large as desired within practical manufacturing limits to supply any amount of water in a given time, or a number of such systems may be installed where it is not practicable to have a single system of sufficiently great capacity.

I wish it to be understood that in describing the heating apparatus for the heaters as a gas burner, and the heating agent as gas, that I have not intended to limit my invention to this or any other particular heating means or agent. The terms "gas burner," "gas," and "gas controlling valve" used in the foregoing description are merely terms of illustration having no limiting significance.

In the broader aspect of the invention, the gas burner may be considered as typical of some or any heating means or device, the combustible gas or fuel for supplying the burner as being typical of any heating agent which might be used for supplying or generating heat, and the thermostatic controlling valves in the supply pipes as any suitable heat-dominating valves adapted to control the supply of heating agent to the heaters and being themselves controlled by the temperature of the water in the tank. I do not wish to restrict the invention to the use of heaters which require a flame to generate or supply the heat, for I include within the scope of the invention all other heating devices in which the heat-giving agent may be either gaseous products of combustion of fuel developed in the heater, or a previously heated fluid.

Likewise I desire it to be clearly understood that my invention may be carried into effect with the use of many other sorts of thermostats and thermostatically controlled valves than those herein illustrated and particularly described. The pipe connections may otherwise be arranged in different manners, all of which are within the scope of my invention, provided the essential principle is maintained of having a series of heaters which are controlled in operation according to the temperature of the fluid to be heated in different parts of the tank or container. It is of course to be understood also that the invention can be applied to heating other fluids than water, since it is intended to be used for supplying heat to any fluid to which for any purpose it may be desirable to supply heat.

I can best illustrate and explain the commercial and practical advantages of the present invention by mentioning the systems which have hitherto been exclusively in use, so far as I am aware, for the purpose of providing hot water in sufficient quantities to meet sudden and great demands. One previously used mode of meeting the condition described has been to provide a large tank or container capable of holding say five hundred gallons, and a heater in connection therewith of sufficient capacity to keep this large volume of water hot. Such a system is in effect a heat storage system, wherein a large body of water is heated to the required temperature in anticipation of the expected demand and before the demand has been made upon it. To do this requires the initial expenditure of a large amount of heat and the continual expenditure of a considerable amount of heat before any water at all is drawn from the tank. The system must always be in condition to meet the maximum demand, even at those times when the demand is light or there is no demand at all.

One of the advantages of my apparatus or system is the saving of fuel over such a system as that described. My heating apparatus is equally applicable to a circulating hot water system, wherein the pipes with which the hot water taps or faucets are connected form a circuit with the water container and permit a continuous gravity thermal flow, whereby hot water is always accessible to all the taps, even those most distant from the heater. My apparatus which includes the combination of a plurality of heating elements with a water container, permits a relatively very small container to be used in a circulating system upon which the demands may be very sudden and great. With my system I can employ a water container having only a small fraction of the volume of the tank required under the old system. One of the heaters is ordinarily sufficient to keep the small body of water in this relatively small container, and also the body of water circulating through the hot water pipe system, at the required temperature. No great amount of fuel is required when first putting the system in operation to heat this relatively small body of water to the desired temperature, and it is maintained at this temperature when the demand is light, by one heater operating either intermittently or at less than its full capacity, under the control of its thermostat. In this way the water is kept in condition for instant use when drawn in small quantities. When the demand is suddenly increased the other heaters are immediately called into operation and they become effective to heat a larger quantity of water before the previously heated supply is exhausted. Thus the persons desiring to use hot water are not required to wait after turning on the tap until the water runs hot, there is no possibility of exhausting the supply of hot water, and the fuel consumption is kept down to the least possible amount.

The other commonly used means for the purpose specified is an instantaneous water heater which is put in operation only when water is drawn, and has a large enough fuel burner to heat the water to the desired temperature when the maximum flow passes through the heater. Such a heater cannot be connected with a circulating system, and therefore the water in the pipe between the heater and the tap is allowed to cool off when no water is being drawn. Thereupon when one desires even a small quantity of hot water he must draw off the cold water already in the pipe before the hot water flows, and the burner of the heater is operating at full capacity during all this time, wasting fuel and heating enough water not only to supply the demand of the user but also to take the place of the cold water previously lying dead in the pipe system. The heat in the water which lies between the heater and the tap becomes dissipated and lost to a greater or less extent in the interval between closing of the tap and opening it again when more water is wanted. A system of this sort having a large capacity frequently employs large pipes, which contain a relatively large volume of water. The radiation of heat from this large quantity of water and the waste of this water when cool before hot water appears at the tap, are large items of waste, particularly if only small quantities of water are needed each time the system is operated. With my heater there is no waste of water because the circulating system maintains hot water at all of the taps of the system. There is no extra expenditure of gas when small quantities of water are drawn, since the hot water already in the system is sufficient in volume to supply small demands. In the case of large demands the heating agent is turned on only gradually and in amounts exactly regulated to the various demands. The pilot lights employed in connection with my heaters are not a source of waste because they furnish a certain amount of heat which is absorbed by the water which is in condition to circulate constantly through the heaters and the hot water system. Another advantage of my system is that if any part of any heater should fail and require repairs the entire heater can be removed without shutting down the system, because the other heaters are still in condition to operate. In the old systems a failure of any part of the heater requires the whole system to be shut down while repairs or substitutions are made.

What I claim and desire to secure by Letters Patent is:

1. A liquid heating apparatus comprising a container adapted to hold in storage a quantity of liquid, a plurality of heating devices connected in parallel with said container, and means controlled by the temperature of the liquid in different levels in the container for putting said heating devices successively into and out of operation.

2. A liquid heating and storage system comprising in combination a container adapted to hold in storage a quantity of liquid, a series of liquid heating devices arranged to receive liquid from said container and deliver it to the place of demand, and automatic controlling means for causing more or fewer of said heating devices to be put into operation according to the demand for the heated liquid.

3. A water heating apparatus comprising a water container, a water circulating pipe system with which said container is connected, a plurality of water heaters each having its own heat delivering element, said heaters being all connected to receive water from the container and heat the same, and thermally controlled means for admitting the heating agent to the said heat delivering elements to an extent corresponding to differences in temperature between the water at different levels in the container.

4. A heating apparatus comprising in combination, a liquid container, heating means in circulating connection with said container adapted to heat the liquid in the container, a plurality of heat dominating valves for determining the quantity of heat delivered to the liquid in said heating means, and thermally controlled means for operating said heat dominating valves, severally controlled by the temperature of the liquid at respectively different levels in the container.

5. A heating apparatus for liquids comprising a liquid container, a plurality of heat delivering means for imparting heat to the liquid in said container, a heat dominating valve for each of the said heat delivering means, and means controlled by the temperature of the liquid in the container for opening and closing more or fewer of said valves according to the temperature of the liquid in different parts of the container.

6. A hot water system comprising in combination, a water container, a circulating pipe system connected with said container, a plurality of gas water heaters each arranged to take water from the bottom of said container and deliver heating water to the upper part thereof, each of said heaters having smaller capacity than the discharge capacity of the pipe system, and the combined capacity of all the heaters being as great as that of the pipe system, a heat controlling valve for each heater and a thermostat independently connected to control each of said valves, the thermostats being respectively affected by the temperature of water in the container at different levels, whereby to put more or fewer of the heaters in operation according as the average of the temperatures of such levels is respectively low or high.

7. A water heating apparatus comprising a water container, a heater arranged to take water from the lower part of said container and return the water to an elevated part of the container or to an outlet pipe leading therefrom, whereby water is provided at the top of the container at a high temperature, an auxiliary water heater also arranged to receive water from the lower part of the tank and deliver it to the upper part of the tank, a valve for controlling the heat furnished in said auxiliary heater, and thermostatic means in thermal contact with the water at an elevated point in said container, arranged and connected to operate said valve.

8. A liquid heating apparatus comprising a liquid container, a heater in circulating connection with said container, an auxiliary heater also in circulating connection with the container, and thermostatic means controlled by the temperature of liquid in the container for governing the operation of said auxiliary heater according as the first named heater is sufficient or not to furnish the required amount of heat to the liquid.

9. A liquid heating apparatus comprising a liquid container having a delivery outlet, a heater arranged to receive liquid from said container and return the liquid thereto in a heated condition at a point near the said delivery outlet, an auxiliary heater likewise arranged to receive liquid from, and return it to the container, and means for putting said auxiliary heater into operation when the demand for heated liquid is greater than can be supplied by the first heater.

10. The combination of a pipe system, a plurality of water heaters arranged in parallel adapted to deliver water simultaneously to said pipe system, and means controlled by the temperature of the water for putting said heaters severally into and out of operation.

11. In a fluid heating system, the combination of a plurality of heating elements all arranged in parallel in the same system, means for governing the supply of heat furnished by each of said elements, the said governing means for each element being independent of the corresponding means for any other element, and means controlled automatically for operating said governing means to regulate the supply of heat furnished in proportion to the quantity of heated liquid demanded.

12. A liquid heating and storage apparatus, comprising means for containing and supplying a body of heated liquid having an inlet for admitting liquid to be heated, a plurality of heating elements, an independent heat controller for each of said elements, and a plurality of thermostatically operated devices located at different heights in said containing means, and each connected to operate one of said controllers.

13. An apparatus for providing heated liquid, comprising a container for the liquid, heating means connected and arranged for heating the liquid in said container, and a plurality of distinct heat controlling means arranged for operation severally and collectively to increase and diminish the amount of heat furnished by said heating means and means controlled by the temperature of the liquid at a plurality of heights in said container for operating independently the several heat-controlling means.

14. A liquid heating apparatus comprising a container for the liquid, means for heating the container, a plurality of thermostats located at different heights in said container, and means operated by said thermostats for cumulatively increasing and diminishing the amount of heat delivered by said heating means according to the temperatures in the liquid acting on the several thermostats.

In testimony whereof I have affixed my signature, in presence of two witnesses.

ELMER S. STACK.

Witnesses:
ARTHUR H. BROWN,
P. W. PEZZETTI.